(12) United States Patent
Robinson et al.

(10) Patent No.: US 7,788,128 B2
(45) Date of Patent: Aug. 31, 2010

(54) SYSTEM AND METHOD FOR PROVISION OF INFORMATION SERVICES

(75) Inventors: Andrew Robinson, Auckland (NZ); Tingfu Chen, Hamilton (NZ); Surendranath Talla, Atlanta, GA (US); Mallika Talla Robinson, Auckland (NZ)

(73) Assignee: Ask Agent Limited, Takapura (NZ)

( * ) Notice: Subject to any disclaimer, the term of this patent is extended or adjusted under 35 U.S.C. 154(b) by 1179 days.

(21) Appl. No.: 10/279,969

(22) Filed: Oct. 25, 2002

(65) Prior Publication Data

US 2003/0093317 A1    May 15, 2003

(30) Foreign Application Priority Data

Oct. 25, 2001    (NZ) .................................... 515031

(51) Int. Cl.
*G06Q 30/00* (2006.01)
*G06F 7/00* (2006.01)
(52) U.S. Cl. .............................. 705/14.2; 707/E17.014
(58) Field of Classification Search ................... 705/34, 705/8, 14
See application file for complete search history.

(56) References Cited

U.S. PATENT DOCUMENTS

2001/0056389 A1* 12/2001 Fair et al. ...................... 705/34

OTHER PUBLICATIONS

Ammas.com—The Largest Source of South Asian Lifestyle information on the world; http://web.archive. org/web/20010722113653/http://ammas.com/.*

Ammas.com—Welcome Home; http://web.archive.org/web/20011205072744/www.ammas.com/aboutaskamma.cfm.*

Ammas.com—The Original Amma on the Web; http://web.archive.org/web/20010208134212/www.ammas. com/aboutaskamma.cfm.*

Amma Stirring Up the Masses on the Internet, Mar. 30, 2000, http://web.archive.org/web/20010627205710/www.ammas.com/release 1.cfm.*

Ammas.com—The Original Amma on the Web; The Ask Amma tm FAQ; Sep. 1, 2000 http://web.archive.org/web/20001206120900/www.ammas.com/aboutaskamma.cfm.*

Ammas.com—The Original Amma on the Web; Making Your Site a Success—News and Tips from Ammas.com; Oct. 21, 2000. http://web.archive.org/web/2001010620200/www.ammas.com/newsdetal.cfm?newsid=. . . .*

Ammas.com—The Largest Source of South Asian Lifestyle and Cooking Information in t . . . ; Now you Can Earn Money with Ammas.com! Mar. 6, 2001, http://web.archive.org/web/20010406083020/www.ammas.com/newsdetail.cfm?newsid=. . . .*

Ammas Cooking Site—Over 36,000 Recipe! Terms and Conditions of use http://web.archive.org/web/20000818150247/www.ammas.com/terms.cfm.*

(Continued)

*Primary Examiner*—Yehdega Retta
(74) *Attorney, Agent, or Firm*—Donn K. Harms

(57) ABSTRACT

A system for generating rewards for information rendered by an information provider to a user. The system includes a receiving element to receive an information request from the user and identification elements to identify the user. The system also includes a delivery element for delivery of the information requested by the user from a service provider and a voluntary reward element for allowing the user to provide a reward to the service provider. A value determination element provides a system of value for the user based upon the reward provided by the user.

18 Claims, 2 Drawing Sheets

OTHER PUBLICATIONS

Ammas.com—The Largest Source of South Asian Lifestyle and Cooking Information in t . . . p. 1-3, Ammas Seeks Your Advice—Be on Amma Today; Sep. 5, 2000, http://web.archive.org/web/20010406085453/www.ammas.com/newsdetail.cfm?newsid=60.*

* cited by examiner

SYSTEM AND METHOD FOR PROVISION OF INFORMATION SERVICES

FIELD OF INVENTION

This invention relates to systems and methods for generating reward for the provision of expertise from a community of users of an electronic medium.

BACKGROUND

There are numerous information services provided to customers through electronic mediums such as the Internet. Most information services are either undertaken on a contractual basis where users pay a specified sum (typically before the service is performed), or the service is provided for free. Typically all users are considered equal and receive an equal standard of service.

In most situations information providers determine their own value and/or select their own prices. No system to date automatically adjusts or determines the value of an information provider based upon interactions with the user in such a manner that takes into account the value of the user and the valve of the advisor, as determined by a centralised system.

What is further required is that the system provides incentives to information providers to provide higher quality of information at a faster turnaround rate. In addition the system should increase usership through user competition and reward.

DEFINITION

Throughout this specification "information" and derivatives thereof means: information and content including but not limited to text, visual, audio and audio visual content provided though a communication system including but not limited to computer networks or systems such as the Internet and telephony networks or systems.

"Information provider" includes any advisor, expert or service provider registered on the system.

OBJECT

It is an object of the present invention to provide improved systems and methods for generating reward for information services, or at least to provide the public with a useful choice.

STATEMENT OF INVENTION

In one aspect the present invention consists in a system for generating revenue for information rendered by an information provider to a user, said system including
  receiving means to receive an information request from the user,
  identifying means for identification of the user,
  delivery means to deliver the information requested by the user from a service provider
  reward means for allowing the user to provide a reward to the service provider,
  value determination means to provide a system value for the user and advisor based upon reward provided by users and advisors.

Preferably the value determination means further provides a system value for the information provider.

Preferably the system value for the service provider is based on the system value for the user.

Preferably the value determination means includes means for recording rewards received from the user for the purpose of compiling a user history of transactions and there by update the system value ranking of the user.

Preferably the reward is a gratuity, donation, tip, or other form of payment paid to the service provider or the system.

Alternatively, the reward is a comment on the service or a scaled ranking of the value of the service received.

Preferably all or part of the gratuity, tip, or other form of payment is used to compensate one or more of the in formation providers.

Preferably the means to determine the value of the user includes firstly identifying the user and then using the identity to compile a history of the user's transactions.

Preferably the users can alter their system value by making purchases of goods or services.

In a further aspect the present invention consists in a method for generating revenue for information rendered by an information provider to a user, said system including the steps of:
  receiving an information request from the user,
  determining the identity of the user,
  delivering the information requested to the user from a service provider,
  attaching a value to the information request based on the user's identity,
  allowing one or optionally more service providers to respond to the information request by providing the required information and receiving rewards commensurate, or in relation, to the value of tie user,
  providing the user with an opportunity to provide a reward to the information provider.

Preferably the reward is in the form of a gratuity, donation, tip or other form of payment.

Alternatively the reward is the form of a comment.

Preferably all or part of the gratuity, donation, tip or other form of payment is used to compensate one or more information providers.

Preferably the method includes the step of recording the feedback received from the user for the purpose of compiling a user history of transactions for the system to thereby update the value ranking for the user.

Preferably the user history will include information relating to the gratuity, donation, tip or other form of payment paid by the user as well as the number of queries the user has submitted.

More preferably the user history will be based on a formulation of money paid relative to the number of queries submitted and the value of the queries according to expert assessment.

In a still further aspect the invention comprises computer software incorporating a system or method for generating revenue according to any of the above Statements of Invention.

In a still further aspect the present invention comprises a network incorporating a system or method for generating revenue according to any of the above Statements of Invention.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

The invention will now be described with reference to the accompanying drawings in which.

PREFERRED EMBODIMENT

Figure 1:
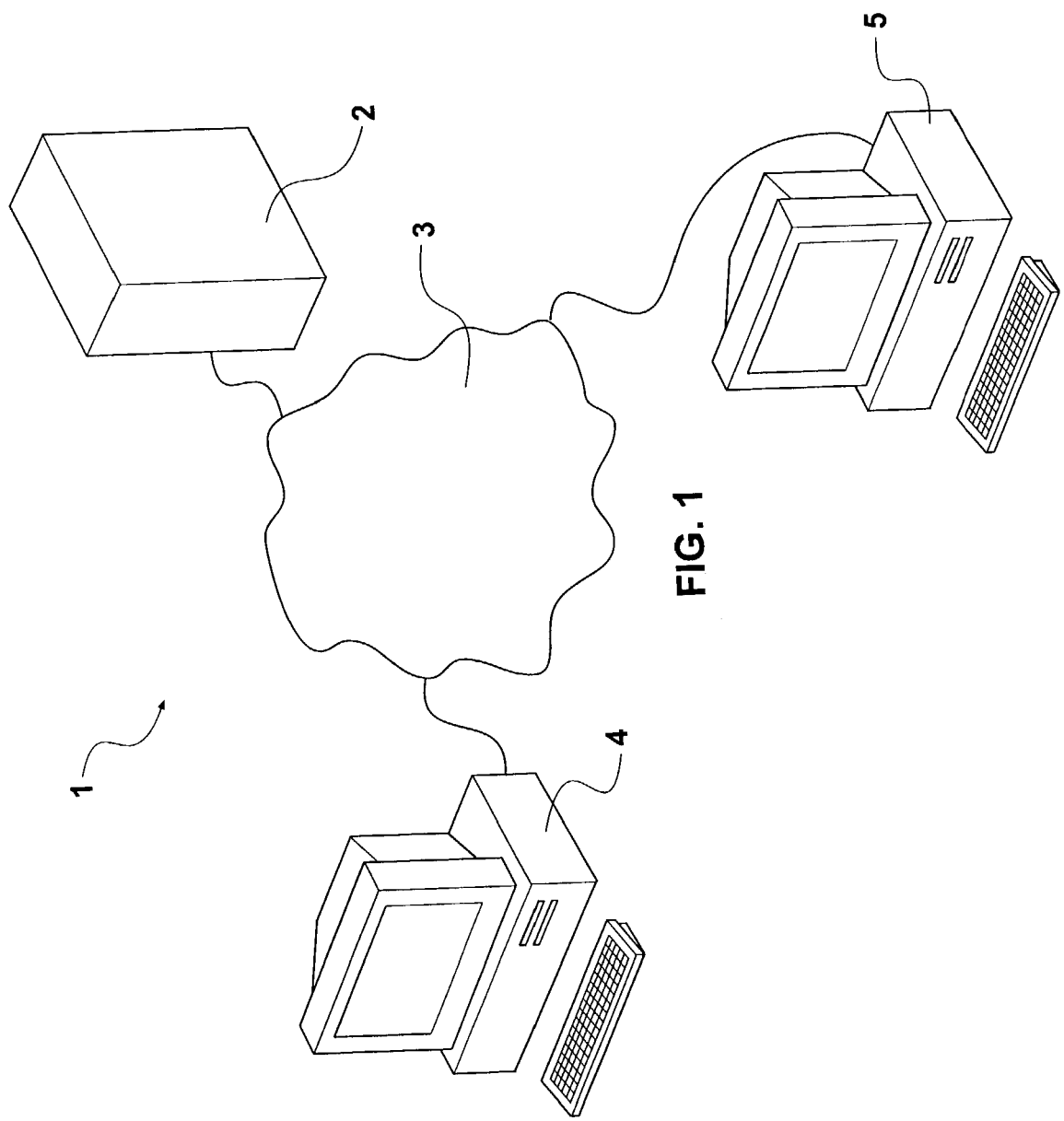
FIG. 1. represents a schematic drawing of the network in Example 1.

The present invention provides systems and methods for generating rewards for information.

Referring to the drawings, the following examples are given by way of illustration only.

Example 1

In this example the present invention is described with reference to information provided over a website, by way of an on-line query form. The website can be, for example, either an internet or intranet website.

The present invention is based on a "competitive gratuity" system, which allows users to contribute money to information or service providers, such as specific experts for specific advice.

Referring to FIG. 1 the network 1 comprises a server 2 for the site which is linked to the internet 3. A user of the system will go on-line using their own personal computer 4 to submit a query. Experts may also log on to the internet 3 using their computer 5 to view the queries.

The system will require the user to enter their details before submitting a query on a topic. Topics are divided into numerous categories, each category having a number of experts registered to handle queries in that category. Programs can be developed to perform this analysis.

Figure 2:
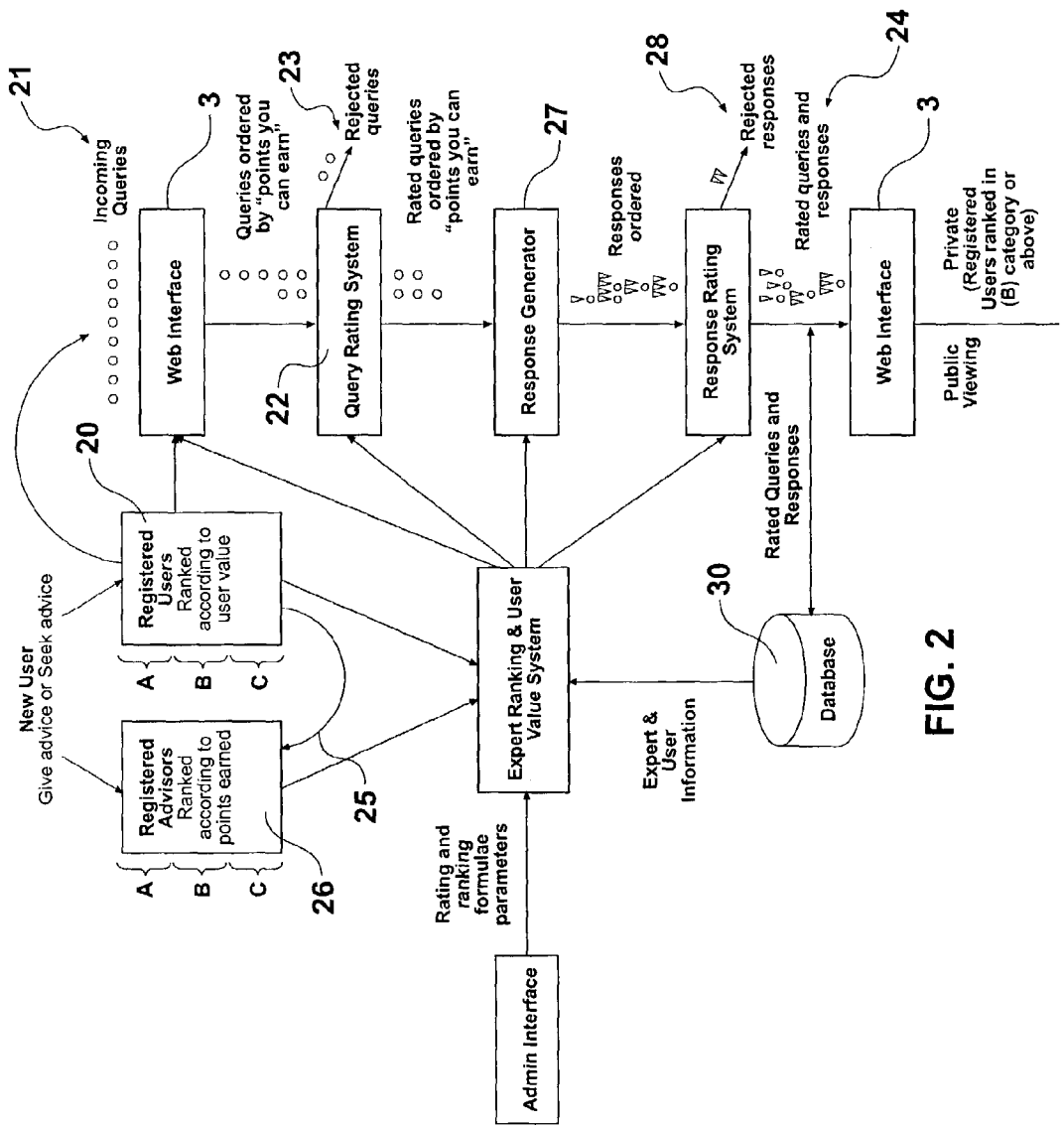
FIG. 2. represents a schematic flow diagram of Example 1.

This system will now be discussed with reference to FIG. 2. When a user 20 submits a query 21 the query 21 is considered by a council of experts or by way of software to provide a query rating system. The system in the preferred form ranks the queries by the points an expert can earn by answering the query. The Council of experts or the program will either approve or disapprove 23 the query 21 according in the preferred form, to pre-selected criteria including for example questions such as, do we have an expert that can advise in this field.

Approved queries are then rated by the query rating system 22 and made available to the registered advisors or experts 26 in that category for their response. The experts 26 prepare and submit a response 27, which may be reviewed by the council of experts 22 in that category. The council of experts 22 may then ascribe a rating to the responses. Some responses may be rejected 28. Again software could be developed to accept or reject responses and to ascribe a rating or both.

The responses are then published and/or submitted 24 to the user. The user 20 may opt to pay a gratuity 25 to the system for the service. The system will record the users 20 history including the history of gratuity payment. The system will then ascribe a rating to the user, or update the users rating.

The higher the rating of the user 20, the more points allocated to the query 21. Experts 26 will compete to answer queries 21 having the highest points.

As such, the invention provides users with the ability to earn points and recognition based on their user history. The more points the user has, the higher quality of service they can expect from the system, because the more points a user has the more points experts will earn for answering the user's queries. And the more points an experts earns, the higher commission on gratuity they will tend to receive. The quality of service could include factors such as speed of responses, amount of detail in the response, and effort and attention expended.

The result is that as well as registered experts competing against each other to become the top ranked expert, the present invention allocates points for users so that they too compete against each other to become the most valuable user, ultimately receiving the most attention, the fastest service, and most in depth advice from the experts.

Both experts 26 and users 20 can be graded. FIG. 2 shows three grades in each group (A, B, C) but of course the number of grades can be selected so as to be most useful for the system providers. Thus experts could be top ranked advisors able to rank queries (A), qualified advisors (B), and Registered advisors without qualifications (C). Users could be top-ranked users (A), qualified users (B), or registered users without qualifications (C).

The information is stored in database 30.

An example of how the present invention will work is as follows:

Arvind, a user 20 has a question 21 for a service provider of Immigration-related information.

"Dear Sir, I'm working as a software engineer in the USA on H1-B visa for the past three years. Recently I took a permanent job. Can I take one month unpaid leave on H1-B visa? Will my job be secure after one month?"

The system of the present invention will first establish who Arvind is, or more importantly, how valuable Arvind is. To determine how valuable Arvind is the system will ask questions such as is Arvind a first time user?

has Arvind submitted many queries without giving anything in return?

has Arvind asked only a few questions but given gratuity to his favourite experts for their advice?.

If Arvind has used the system before, how valuable have his questions been according to the council of expert's assessment?

Based on Arvind's history the system will give his query a certain number of points to reflect his value. The higher Arvind's points the more likely he is to attract higher quality answers from the experts 26—who are competing to increase points for higher commissions.

If Arvind has tipped the experts generously and used the system sparingly he will be a high ranked user. Arvind will know he is a high ranked user and when he submits a query he will expect and receive several top quality answers 24 in a matter of hours. One of the answers gives specific advice on how he can take his one month unpaid leave. He is thus a very satisfied customer and tips the expert generously 25 increasing his ranking even further.

If Arvind has never used the system before, or if his queries are rated badly by the council of experts or program, he will still receive answers but not with the same urgency and possibly with less attention. If he has used the system often without giving any gratuity its quite possible the experts will delay responding to his query or even ignore the query. Arvind can see where he ranks compared to other users and can consider whether or not he should pay more gratuity 25 in order to increase his ranking.

The system is designed to interact with an Ask Agent Form, through which users submit their query and personal details.

The system can be viewed in conjunction with commerce such as e-commerce. The purchase of goods or services by a user can attract points and thereby increase his ranking and value.

User Functionality

In asking a question through the Ask Agent form, the user is essentially registering with the information provider—giving a name, email address, country, topic and query.

There may be a Public/Private radio button option incorporated into the system. If this option is not filled in, the system will set the default to Public.

Users will also need to enter a password, which is their email address by default (unless they have changed it through their home settings). The passwords for Registered Experts School Users and Affiliates will be consolidated into a single login/password, based on email address, so that users do not have to remember multiple logins/passwords when using the system website.

User Registration and Home Page

Complete registration with a password
User login page
Receive a home page which will give the following information:
   User summary
   User information edit
   Queries made by the user
   Responses received by the user
   Allow user to add payment to their gratuity account (see below)
   Links to information site main features

Receiving Responses from the Registered Experts

If the user selected Private, responses only appear on the user's private home page. Public responses appear to everyone—as seen with current Ask Agent systems.

In addition to the current system of showing responses, when showing a full tip, two links will appear below each experts response
   "Thank this expert in words"
   "Thank this expert with a gratuity payment"
   "Thank this expert in words" allows the user to write a note which is emailed to the expert and stored in the database (relevant to the expert so that we can display user feedback to each expert homepage at a later date).
   "Thank this expert with a gratuity payment" allows a registered user to:
      enter credit card information and make a payment directly to the expert (commission goes to system) or give payment (gratuity) from their user account
      add gratuity to their account to give later.
      Write a note to the expert.
      The system also allows registration for unregistered users

User Data Display

A page will show Registered User rankings by category
Rankings will be listed by the names associated with a single email address (one email address can have many names). Email address is not displayed.
   User can view rankings according to User Rating (UR).
   User can view rankings according to User Value (UV)
   User can view rankings according to number of responses received.

Registered Expert Functionality

Rating Queries

The ability to approve and/or rate queries will be available to all Council Experts for each category. The query will remain for all Council Experts to rate it. The system takes the average rating at time when response is submitted and uses that average to calculate the points the expert receives for the response).

The ability to transfer a query to another category (for queries submitted to the wrong category).

A special administration page for content administrator will show queries that are not rated in a reasonable timeframe, and allow content administrator to rate those queries.

Responding to Queries

When responding to the queries, the registered Experts will be able to see the question and the following information:

"Points you can earn (assuming all Council Members rate the query or the program rates the query):"
For 1-star average response: $((2+QR)/4)\times UR)+UR$
For 5-star average response: $((10+QR)/4\times UR)+UR$

Rating Responses

When a response is rated, the expert who responded to the query will receive points based on the UR, QR (query rating preferably an average of all ratings so far, but otherwise as the system is now), and the Response Rating (RR).

User Rating (UR) and User Value (UV) can be calculated by the following formulae:

$$UQR = \text{User's Average Query Rating received}$$

$$TQ = ((11-UQR)/10) \times \text{Total number of Queries Asked}$$

$$AGP = \text{Account Gratuity Points}$$

$$DGP = \text{Distributed Gratuity Points (points allocated to experts)}$$

As stated above UR can be increased by purchases of goods or services if this facility is provided by the system.

$$UR = (UQR/10) \times ((DGP/TQ)+10)+(DGP/TQ)$$

$$UV = (UQR/10) \times (((DGP+AGP)/TQ)+10)+((DGP+AGP)/TQ)$$

Minimum UQR=2

Minimum TQ=1

Note: UQR Scale 1-10 (not 1-5)

A working formula for calculating the points an expert receives when the response is rated can be:

$$((RR+QR)/4)\times UR)+UR/\text{number of Council Members in category}$$

Note: RR Scale=1-10 (not 1-5)

Rating Points You Can Earn

This can be achieved by the following formulas:

| | |
|---|---|
| PR | Position in Rating Sequence (for a query/response) |
| PYCE | Points You Can Earn |
| QR-PYCE | Query Rating PYCE |
| QR-PP | Query Rating Penalty Points |
| CMR | Council Member' Rating |
| QAR | Query Average Rating |
| QR-PYCE | $(TCM + 1 \cdot PR) * ((TCM + 1)/(TCM + PR)) * (UR/5)$ |
| QR-PP | $(QAR - CMR/10) * TCM * (1 + (QAR - CMR)/10) * (UR/5)$ |
| TBP | Total Bonus Points |
| TPL | Total Penalty Points |

-continued

| | |
|---|---|
| TBP | Sum of all QR-PYCE for that topic |
| TPL | Sum of all QR-PP |

Response Points You Can Earn Can be Calculated as Follows:

| | |
|---|---|
| AQR | Average Query Rating |
| RR | Rating Received for submitted response |
| UR | User Rating |
| TCM | Topic Council Members |
| NR | Number of Respondents so far |
| R-PYCE | Response PYCE |
| R-PYCE | [UR/10 * (RR + AQR/NR)]/(1 + TCM/5) |

Accessing Data Through Registered Home Page

In addition to the current content in the registered home page, the registered expert can also view
1) Their commission rate
2) How much gratuity they've earned. Gratuity commissions are based on the following formula:
   Registered experts in each category make 10% commission.
   Featured experts in each category make 10-40% commission, according to the following formula:

FR=Featured experts Rank by total points in category

NF=Number of Featured experts in category

40−((FR/NF)*30)

Council Experts in each category make 40-90% commission for example according to the following formula CR=Council Expert's Rank by total points in category NC=Number of Council Experts in category

90−((CR/NC)*50)

Administration Functionality
   The system can store gratuity information such as:
   Gratuity information listing for all users (high to low), with link to each user's information.
   A page of gratuity for all experts (high to low), with link to each experts information.
   Ability to change commission percentage from default settings (see above) for each Expert.
   Gratuity information for each category
   Gratuity information for system earnings.

Example 2

In this example the present invention is incorporated into a telephony system.

Stephen has a webpage in which he has published information about butterflies in Malaysia, a topic on which he considers himself an expert. Stephen has registered as an expert on a system which employs this invention. He has given his contact information, selected text and telephone as his expertise delivery options, given his email and telephone number, and selected Lepidoptery as his field of expertise.

Stephen can log into the system and earn points by answering questions in the field of Lepidoptery. The system can also generate code which Stephen can put on his website and which allows visitors to his website to 1) ask Stephen a question directly, or 2) try to arrange a time to call Stephen, 3) Make a gratuity payment to Stephen.

If the user asks Stephen a question directly, and if the user is a registered user of the system which employs this invention, Stephen can see how many points he will earn for answering the question. The same is true if the user seeks to arrange a time to call Stephen.

In the following example, the user is a registered user of the system that employs this invention. The user visits Stephen's site, likes what he sees, and makes a gratuity payment to Stephen, for which Stephen receives a commission. By making a payment the user's value increases. In turn, Stephen's earnings increase, which increases his value.

The user also seeks to call Stephen and puts in a request to do so, for 15 minutes on Tuesday of next week. Stephen receives the request and notes, to his delight, that the user's value is quite high. He agrees to the conversation and his telephone code number is sent to the user. The user calls a central system, and then Stephen's extension. The user and Stephen talk for 15 minutes. At the end of the call Stephen is asked to rate the quality of advice he received by pressing 1 to 10. Stephen is allocated points based on the user's value, rating received, and Stephen's value improves accordingly.

A graph keeps track of Stephen's value so visitors to his website can see his history.

Example 3

The present invention can be applied to numerous forms of information. In this example the present invention is applied to the music or movie industries.

Instead of requesting advice from an expert, a user requests a particular recording (such as a soundtrack or movie) or number of recordings from the service provider. The user will have the opportunity of paying a gratuity to the service provider upon receipt of the downloaded song(s) or any other time. The system will store information on the user including information on the gratuity received. The user will be allocated a value rating, or have an existing value rating adjusted.

When future requests are submitted by the user, the standard of information provided will depend on the user's rating. The higher the user's rating, the better the quality of service the user is likely to receive because the information provider's rating will increase in proportion to the user's rating.

ADVANTAGES

The system of the present invention adjusts response time and allows for reward generation from information consumers requesting advice from information providers, including but not limited to advisors, experts and artists, through an electronic medium.

By generating rewards for the experts, and increasing their ability to earn rewards, experts and system administrators are given incentive to contribute higher quality information.

Users of the site which have a greater number of points are in turn able to expect information of better quality as well as a faster turn around of response. The system will thus have the additional advantage of increasing user-ship through competition and reward.

We claim:
1. A system for generating a reward for information rendered by a service provider to a user, said system including:
   receiving means whereby an operator of the system receives a query from the user,
   identifying means for allowing the operator to identify the user, delivery means to enable the operator to deliver a response to the query from a service provider to the user, voluntary reward means for allowing the user to provide a first reward to the operator, payment means to enable the operator to provide a second reward to the service provider, and value determination means to provide a system rating of the user based upon at least one of the first reward provided by the user, a history of rewards provided by the user, and an assessed value of previous queries made by the user so that the system rating provides the service provider with a value rating query based on the system rating of the user making the query.

2. The system as claimed in claim 1, wherein the value determination means further provides a system rating for the service provider.

3. The system as claimed in claim 2, wherein the system rating for the service provider is based on the system rating for the user.

4. The system as claimed in claim 1, wherein the value determination means includes means for recognizing rewards received from the user for the purpose of compiling a user history of transactions and thereby updating the system rating of the user.

5. The system as claimed in claim 1, wherein the second reward is a gratuity, donation, tip, or other form of payment.

6. The system as claimed in claim 1, wherein the second reward is a comment on the service or a scaled ranking of the value of the service received.

7. The system as claimed in claim 5, wherein all or part of the gratuity, tip, or other form of optional payment is used to compensate the service provider.

8. A system as claimed in claim 1, wherein the means to determine the value of the user includes firstly identifying the user and then using the identity to compile a history of the user's transactions.

9. The system as claimed in claim 1, wherein the users can alter their system rating by making purchases of goods or services.

10. A method for generating revenue for information rendered by a service provider to a user, said method including the steps of:

allowing an operator to receive an information request from the user, determining the identity of the user, delivering the information requested to the user from the service provider, rating the information request based on the user's value, allowing one or optionally more service providers respond to the information request by providing the required information and receiving rewards commensurate, or in relation, to the rating of the information request, providing the user with an opportunity to provide a first reward to the operator, providing means for allowing the operator to provide a second reward to the service provider, and determining a system rating of the user based upon at least one of the first reward provided by the user, a history of rewards provided by the user, and an assessed value of previous queries made by the user so that the system rating provides the service provider with a value rating query based on the system rating of the user making the query.

11. The method as claimed in claim 10, wherein the second reward is in the form of a gratuity, donation, tip or other form of payment.

12. The method as claimed in claim 10, wherein the second reward is in the form of a comment.

13. A method as claimed in claim 11, wherein all or part of the gratuity, donation, tip or other form of payment is used to compensate one or more information providers.

14. A method as claimed in claim 10, further comprising the step of recording the feedback received from the user for the purpose of compiling a user history of transactions for the system to thereby update the rating of the user.

15. A method as claimed in claim 14, wherein the user history includes information relating to the gratuity, donation, tip or other form of payment paid by the user as well as the number of queries the user has submitted.

16. The method as claimed in claim 14, wherein the user history is based on a formulation of money paid relative to the number of queries submitted and the rating of the queries according to expert assessment.

17. A method as claimed in claim 16, wherein the user history further includes details of purchase of goods or services made by the user.

18. A network incorporating a system according to claim 1.

* * * * *